United States Patent
Schubert (10) Patent No.: US 7,330,934 B2
(45) Date of Patent: Feb. 12, 2008

(54) CACHE MEMORY WITH REDUCED POWER AND INCREASED MEMORY BANDWIDTH

(75) Inventor: Richard P. Schubert, Medfield, MA (US)

(73) Assignee: Analog Devices, Inc., Norwood, MA (US)

( * ) Notice: Subject to any disclaimer, the term of this patent is extended or adjusted under 35 U.S.C. 154(b) by 557 days.

(21) Appl. No.: 10/786,972

(22) Filed: Feb. 25, 2004

(65) Prior Publication Data

US 2005/0188154 A1 Aug. 25, 2005

(51) Int. Cl.
*G06F 12/00* (2006.01)

(52) U.S. Cl. .................. 711/128; 711/144; 711/156; 711/167; 365/49

(58) Field of Classification Search ................ None
See application file for complete search history.

(56) References Cited

U.S. PATENT DOCUMENTS

| 6,091,629 | A  | * | 7/2000 | Osada et al. ............... 365/156 |
| 6,717,879 | B2 | * | 4/2004 | Tanaka ....................... 365/222 |
| 2003/0156486 | A1 | * | 8/2003 | Tanaka .................. 365/230.03 |

OTHER PUBLICATIONS

Analog Devices, Inc., Blackfin Embedded Processor, ADSP-BF535; 2003, pp. 1-44.

Presentation Slides of Background Information on Memory System. Jim Handy, "The Cache Memory Book", Second Edition, Chapters 1 and 2; Jan. 15, 1998.

* cited by examiner

*Primary Examiner*—Jasmine Song
(74) *Attorney, Agent, or Firm*—Wolf, Greenfield & Sacks, P.C.

(57) ABSTRACT

A digital processor with a cache that provides fast and low power operation. The cache contains a tag array and a data array. The tag array indicates whether a value is stored in the cache for a particular external address. Access to the data array is necessary to determine the actual value. Access of the data array overlaps access to the tag array. Access to the data array includes a step in which the charge stored on column lines corresponding to multiple ways within the data array is altered based on information stored in the memory. This step occurs while the tag array is being operated. Access to the data array includes a second step of sensing one of the state of charge on a selected column line. Sensing occurs after the value has been read from the tag array and the value in the tag array is used to indicate which, if any way in the data array to sense. Processors using this approach quickly read information from the cache, but consume small amounts of power and are therefore well suited for use in cellular telephones and portable electronic devices.

22 Claims, 7 Drawing Sheets

CACHE MEMORY WITH REDUCED POWER AND INCREASED MEMORY BANDWIDTH

BACKGROUND OF INVENTION

1. Field of Invention

This invention relates generally to computerized data processors and more specifically to the memory subsystems of such processors.

2. Discussion of Related Art

Computer data processors are widely used in modern electronic systems.

Some are designed for specialized functions. One example is a digital signal processor (DSP). A digital signal processor is configured to quickly perform complex mathematical operations used in processing of digital signals.

One important use of digital signal processors is in chips that control cellular telephones and other portable electronic devices. Fast computation is important in these applications. However, because these data processors are used in devices that derive power from a battery, it is desirable for the data processors to use as little power as possible.

Figure 1:
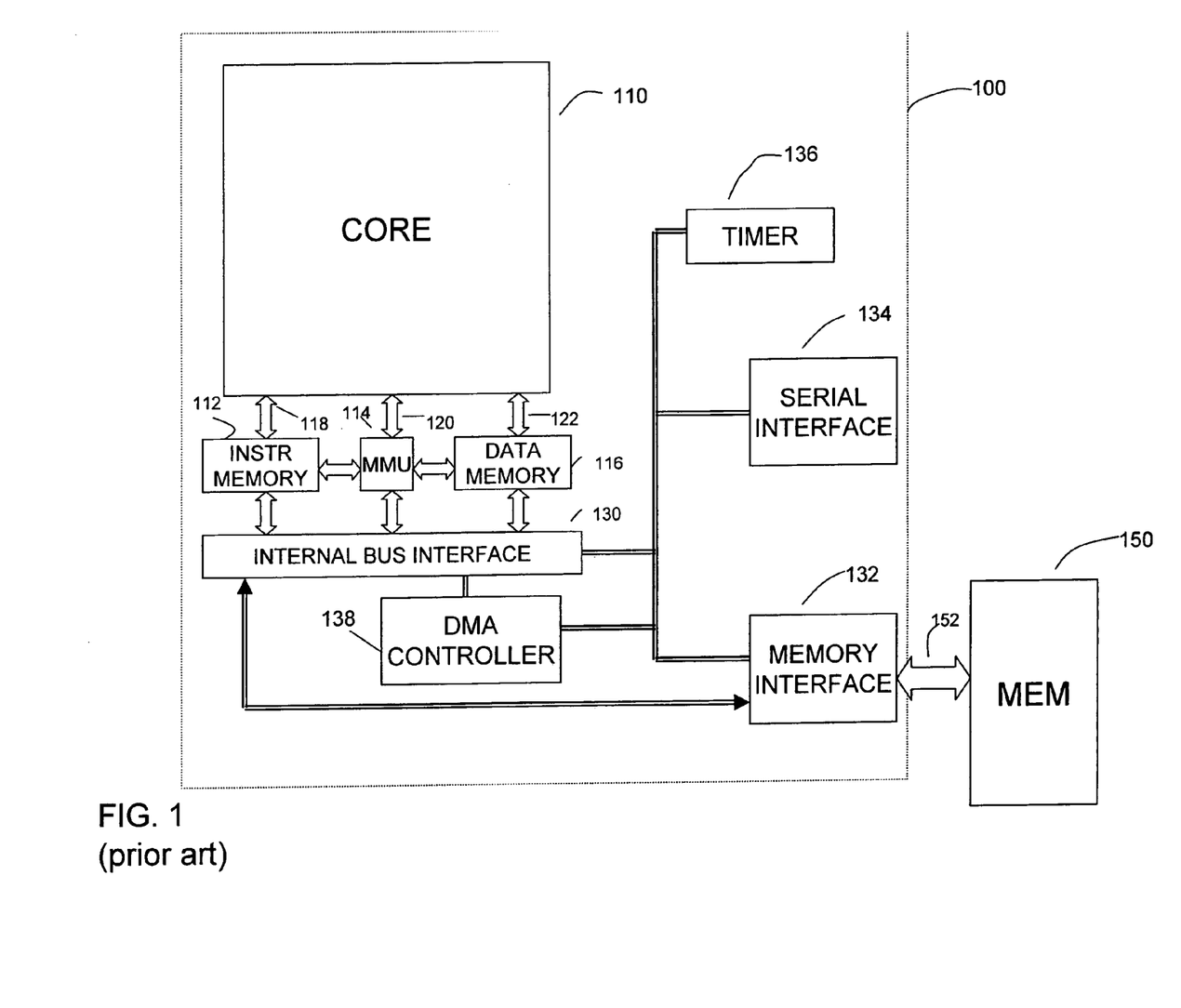
FIG. 1 is block diagram of a computerized data processor.

FIG. 1 shows a high level a block diagram of a computerized data processor. FIG. 1 may represent a general purpose computerized data processor or it could represent a special purpose data processor, such as a digital signal processor. FIG. 1 illustrates a processor chip 100. Within processor chip 100 is a processor core 110. In operation, processor core 110 reads instructions from memory and then performs functions dictated by the instructions. In many cases, these instructions operate on data that is also stored. When an operation performed by processor core 110 manipulates data, the data is read from memory and results are generally stored in memory after the instruction is executed.

FIG. 1 shows that processor chip 100 includes a level 1 instruction memory 112 and an level 1 data memory 116. Both the instruction memory 112 and data memory 116 are controlled by a memory management unit 114. Instruction memory 112 and data memory unit 116 each contain memory that stores information accessed by processor core 110 as instructions or data, respectively.

The level 1 memory is the fastest memory in a computerized system. The area required on an integrated circuit chip to implement large amounts of level 1 memory generally makes it impossible to build a processor chip with enough level 1 memory to store all the instructions or all the data needed to run a program. Therefore, a computer system includes level 2 or level 3 memory. Level 3 memory is generally very slow. Disk drives or tapes or other bulk storage devices are generally used to implement level 3 memory. Level 2 memory is typically semiconductor memory that is slower than level 1 memory. Level 2 memory might be located off-chip. In some cases, level 2 memory is implemented on processor chip 100, but is slower than level 1 memory. For example, level 1 memory might be static random access memory (SRAM) and level 2 memory might be dynamic random access memory (DRAM).

The computer system of FIG. 1 shows off-chip memory 150, which could be level 2 or level 3 memory. Integrated circuit 100 includes a memory interface 132 through which instructions or data can be read from or written into memory 150. Memory 150 is off-chip memory.

In designing a computerized data processing system where speed of operation is a concern, an effort is made to use level 1 memory as much as possible. Semiconductor chip 100 is configured so that memory operations involving instructions or data pass first through instruction memory 112 or data memory 116, respectively. If the needed instruction or data is not located within those units, those units can access memory interface 132 through internal bus interface 130. In this way, processor core 110 receives the required instruction or data regardless of whether it is stored on-chip or off-chip.

To make maximum use of on-chip memory, a memory architecture called a cache is often used. A cache stores a small amount of information in comparison to what can be stored in level 2 or level 3 memory. The cache stores a copy of information contained in certain level 2 or level 3 memory locations.

In the following description, a cache operating in connection with level 2 off-chip memory will be explained. However, a cache can also be used with on-chip memories or off-chip level 3 memories. Also a cache will be explained in terms of data read from memory. It should be appreciated, though, that a cache can store information to be written into off-chip memory and in operation of a computer system, a cache would be used for both read and write operations.

Figure 2:
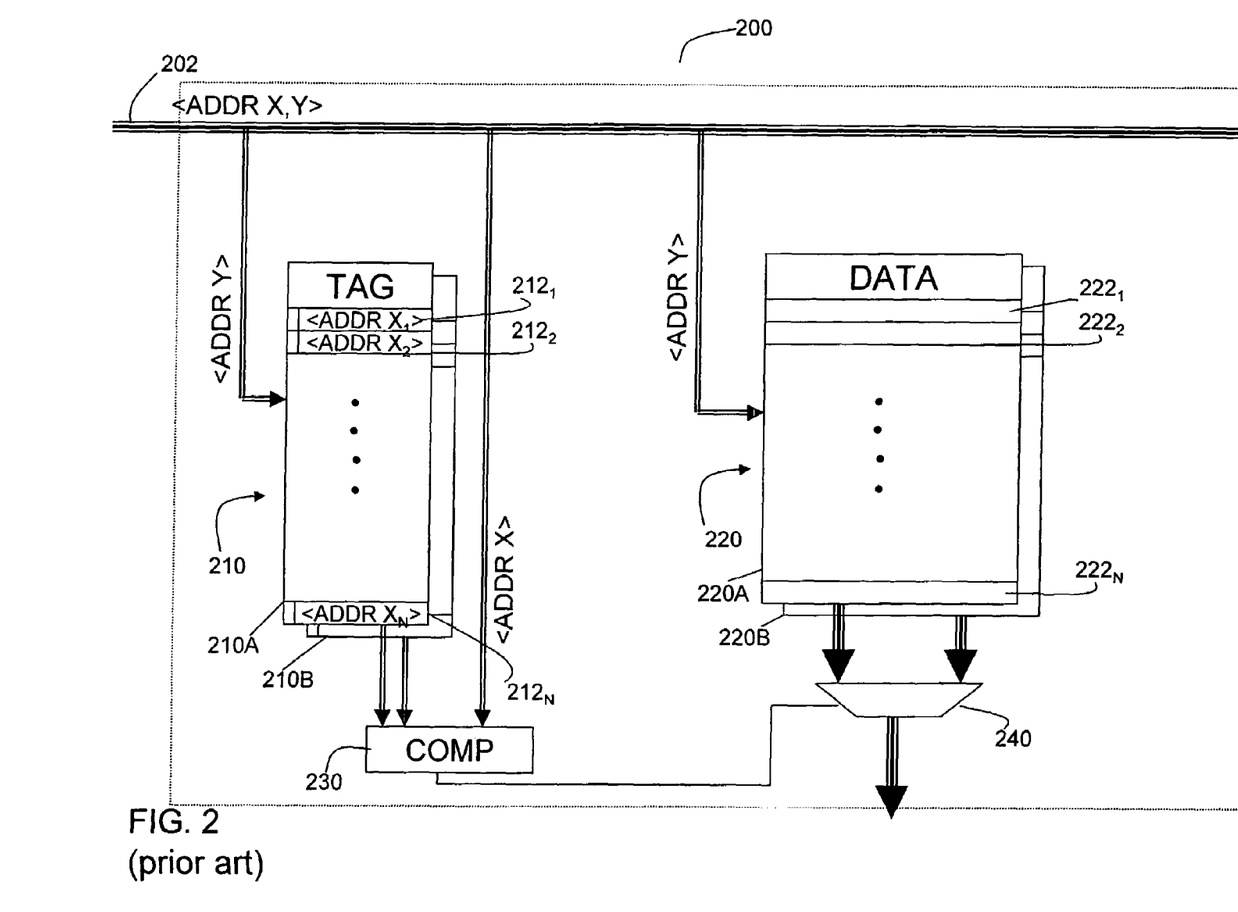
FIG. 2 is a block diagram of a cache that may be used in the computerized data processor of FIG. 1.

FIG. 2 shows in block diagram form a cache 200. Control circuitry is not explicitly shown. However, it is well know in the art that semiconductor circuits, including those relating to memories, contain timing and control circuits so that the circuitry achieves the desired operation.

Cache 200 may represent a cache within instruction memory unit 112 or a cache storing data within data memory unit 116. The physical architecture of the cache does not depend on the type of data stored in the cache. In operation, processor core 110 generates an address on address line 202. The address is shown to have an X portion and a Y portion. Each portion of the address is made up of some number of the total bits in the address. The X portion and the Y portion of the address together define the address of the smallest "item" of information that cache 200 stores.

An "item" of information in a cache may be an individual word or byte. However, most semiconductor memories are organized in rows. Time is required to set up the memory to access any row. Once the memory is set up to access the row, the incremental time to read another location in the row is relatively small. For this reason, when information is read from off-chip memory to store in a cache, an entire row is often read from the memory and stored in the cache. Little additional time is required to store an entire row, but significant time savings results if a subsequent memory operation needs to access another location in the row. In this case, the "item" stored in the cache corresponds to an entire row in the off-chip memory. Additional address bits are applied to the cache 200 to select a particular piece of information from the item. For simplicity, FIG. 2 shows address lines to access an "item" but does not show additional circuitry or address lines that may be present to access a particular memory location within any item.

FIG. 2 shows that cache 200 contains a tag array 210 and a data array 220. Each location $222_1 \ldots 222_N$ in data array 220 can store an "item". Tag array 210 contains corresponding locations $212_1 \ldots 212_N$. The locations in tag array 210 indicate whether an item is stored in the corresponding location in data array 220 and, if so, which memory address the item is associated with. Each of the locations $212_1 \ldots 212_N$ has two fields (not numbered). A first field stores an indication of whether valid data is stored in the corresponding location in data array 220. This field is sometimes called the "data valid" field. The second field in each of the locations $212_1 \ldots 212_N$ identifies the address in level 2 memory that is stored in the cache. This field is sometimes called the "tag" field.

To simplify the construction and increase the speed of operation of the cache 200, the locations within cache 200 in which the information for any level 2 off-chip memory location may be stored are constrained. As shown, the Y portion of the address bits of each external memory address are applied to tag array 210 and data array 220. The Y portion of the address bits are used to select one of the locations within these arrays. If information from an a level 2 memory location having those Y portions is stored in the cache, it is be stored at the selected location. To indicate that information has been stored in the data array, the data valid field in the corresponding location in the tag array is set.

Because many external addresses have the same values for their Y bits but different values for the X bits, the information stored in the data array may correspond to any one of these external addresses. The tag field in the tag array stores the X bits of the address that is being represented by the information stored in the cache.

To determine whether cache 200 stores information for a specific address in level 2 memory, the Y bits are used to access a particular location in tag array 210. If the data valid field in that location is set, the tag field in the location addressed by the Y address bits is applied to comparator 230. A second input to comparator 230 comes from the X bits on address line 202. If the X bits match, then the location within data array 220 addressed by the same Y bits can be used in place of making an access to external memory.

Where information already stored in cache 200 can be used in place of making an access to level 2 memory, it is said that the access resulted in a cache "hit." Conversely, where the cache does not store information corresponding to the external address being accessed, a "miss" is said to occur.

To increase the chance of a "hit," cache 200 is constructed with multiple "ways." A way is sometimes also called a bank. In the illustration of FIG. 2, two ways 210A and 210B are shown in tag array 210 and a corresponding two ways, 220A and 220B, are shown for data array 220. Each way is addressed by the Y bits of the address as described above. However, because the tag array can store a different tag in each way for the same Y values, having two ways allows two locations with the same Y bits to be stored in the cache. Being able to store twice as many values nearly doubles the chances of a "hit" and therefore reduces the time required for memory access.

A cache can have any number of ways. Adding more ways decreases average memory access time, but also increases the amount of high speed memory related to implement the cache.

To ensure that adding ways does not increase memory access time, comparator 230 contains circuitry to simultaneously compare the values in the tag fields in all the ways with the X address bits of the applied address. The output of comparator 230 indicates whether there is a match between the X bits of the applied address and the X bits at the location in any of the ways of the tag array addressed by the Y bits.

The output of comparator 230 also indicates in which way the match was found. The output of comparator 230 is provided to multiplexer 240. Multiplexer selects the output of the appropriate way when there is a cache hit.

It would be desirable to provide a cache from which items can be quickly read with low power.

SUMMARY OF INVENTION

In one aspect, the invention relates to a computer system having a cache. The computer system has a core generating memory addresses with a plurality of bits. The cache comprises tag array having an output and an address input coupled to a first portion of the plurality of bits of the memory address output of the core, the tag array providing at its output information stored in the tag array in response to a value at the address input; a comparator having a first input coupled to the output of the tag array and a second input coupled to a second portion of the plurality of bits of the memory address output of the core and an output, the comparator providing an output in response to a memory address output of the core at a first time; and a data array organized as a plurality of ways implemented in a semiconductor memory having a timing input. The semiconductor memory has an address input; a plurality of lines; a plurality of memory cells connected to the lines to alter the charge one the lines selectively in response to the address input at a time indicated by the timing input and a plurality of sense amps. Each line can be connected to a sense amp that has an output indicating a value read from a line and an enable input. The cache includes a control circuit outputting a plurality of timing signals, with a first timing signal coupled to the timing input of the data array and a second timing signal connected to the enable input of the sense amp, wherein the second timing signal occurs after the first timing signal and before the first time.

In another aspect, the invention involves a method of operating a cache in a computer system. The cache stores items associated with addresses in memory in the computer system and has at least one way with a tag array and a data array. Information in the tag array indicates, for each address applied to the cache, whether information in the data array is associated with the applied address in memory. The data array is implemented as an array of cells connected to lines and a plurality of sense amps, with a sense amp being connectable to each of the lines, comprising, for each of the at least one ways. The method includes making a determination, based on information stored in the tag array, whether an item associated with the applied address is stored in the way in the data array; altering the state of at least one line in the way associated with the applied address starting before completing the determination; and, after completing the determination, when the information indicates an item is stored in the way in the data array, enabling at least one sense amp associated with a line in the way when it is determined that an item associated with the applied address is stored in the way.

In yet another aspect, the invention relates to a method of operating a cache in a computer system. The cache stores items associated with addresses in memory in the computer system and has a tag array and a data array. The data array has a plurality of ways with information in the tag array indicating, for each address applied to the cache, in which, if any, way in the data array information associated with the applied address is stored. The data array is implemented as arrays of cells connected to lines and plurality of sense amps, with a sense amp being connectable to each of the lines. The method includes applying a first portion of the applied address to the tag array to address a location in each way of the tag array; comparing a second portion of the applied address to information read from the addressed locations in each way of the tag array to produce at a first time, an indication of a match between the first input and one of the ways; before the first time, altering the state of lines associated with the first portion of the applied address in each way of the data array, with the state of the lines based on information stored in the data array; and after the first time, sensing the state of a line associated with the first portion of the applied address in the data array, with the sensed line selected in response to the output of the comparator.

In another aspect, the invention relates to a cache with a tag array and a data array, each implemented in memory having columns of memory cells and a sense amp. Access time for the data array overlaps access time for the tag array. While the tag array is being accessed, the lines in the data array are activated to prepare them to be read. The lines in the data array are not sensed until after a value is read from the tag array indicating which line should be read.

In one embodiment, the invention is used to implement a fast, low power processor for cellular telephones or other hand held electronic devices.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 3:
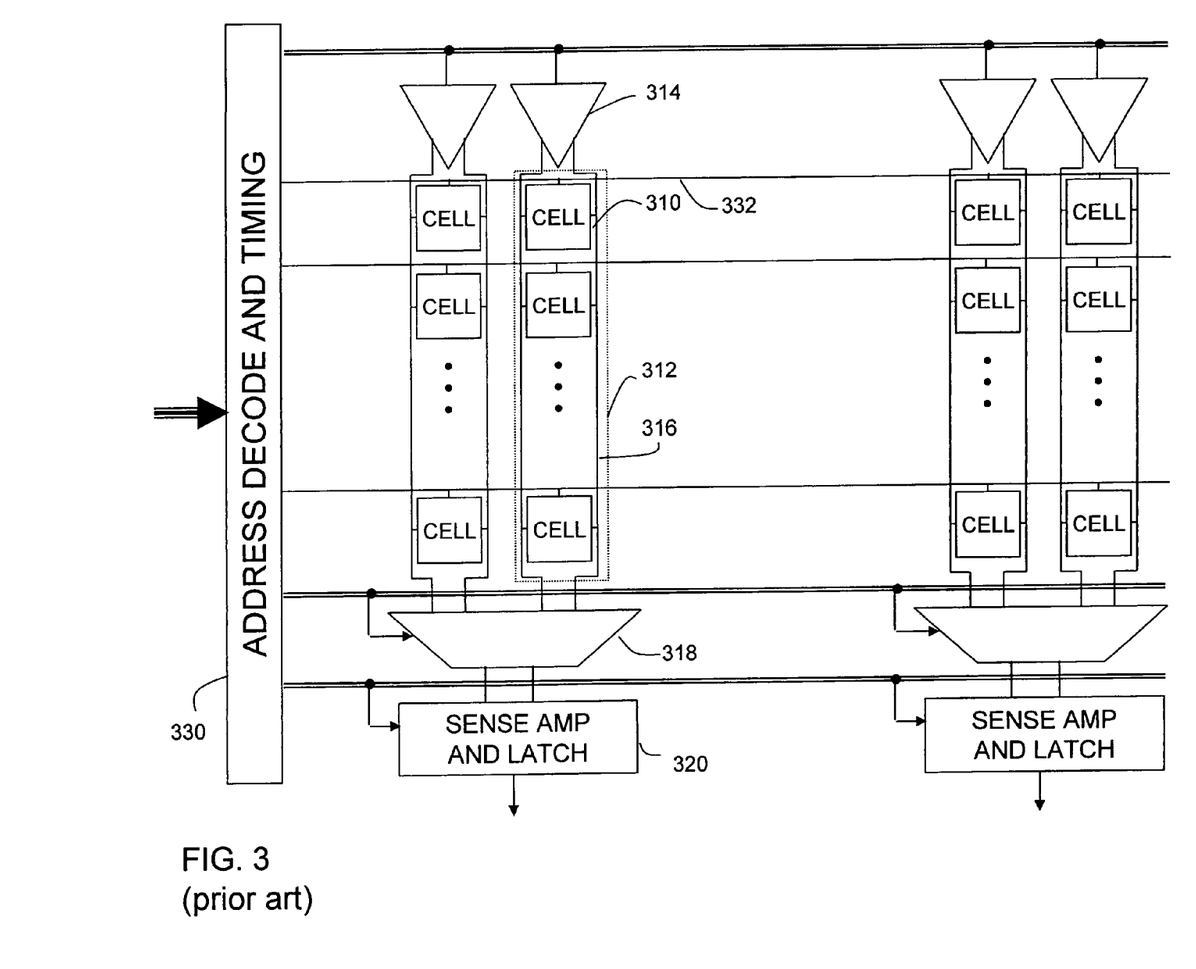
FIG. 3. is a block diagram of a conventional RAM, such as may be used to implement a cache of FIG. 2.

FIG. 3 is a block diagram representing a conventional memory circuit. The memory contains an array of memory cells 310. Each cell 310 stores a bit of information. The cells are arranged in columns, such as column 312. All of the cells in a column are connected through a column line 316, which is shown as a pair of conductors forming one differential line.

Each column line 316 is connected to a driver, such as driver 314. Each cell in the column is connected to a different word line 332. Each cell in the memory corresponds to the intersection of a column line and a word line. FIG. 3 shows a sketch of only a small portion of a memory. Memories storing multi-bit words have multiple arrays of cells, with one array of cells for each bit in the word.

To read the value stored in a cell corresponding to a specific address, an address decode and timing circuit 330 determines the column containing the addressed cell. The driver 314 corresponding to that column precharges the column. For example, driver 314 charges the column line 316. The driver may be turned on as the access operation is initiated. Alternatively, the driver may remain on between memory access operations. Regardless of when driver 314 is turned on, it is turned off, leaving column line 316 in a charged state, to complete the memory access.

Next, the word line 332 corresponding to the addressed cell is turned on. The turned on cell selectively alters the charge on the column line 316, based on the value of the bit stored in the cell.

A sense amp 320 is then turned on. Sense amp 320 outputs a value representing the charge on the column line 316 and hence the value stored in the accessed cell. The output of the sense amplifier is latched and becomes the output of the memory chip.

Some memories contain one sense amp for every column. However, memory cells are much smaller than sense amplifiers. To avoid wasted space between columns of memory cells, the columns of memory cells are made as close together as possible, with a group of columns provided for each sense amplifier. A multiplexer 318 connects the sense amplifier to the correct column from a group. Multiplexer 318 for the memory creating data array 220, may be separate from multiplexer 240. However, cache architectures are possible in which a multiplexer 318 performs the function of multiplexer 240. Such an architecture is possible if each column in a group connected to a sense amp form corresponding portions of different ways.

To read a value from a cache, a value must be read from the tag array and a value must be read from the data array. The value read from the tag array dictates which value should be read from the data array. One possibility is that the data array can be read after a value is read from the tag array. Another possibility is that the data array and tag array can be read simultaneously.

Figure 4A:
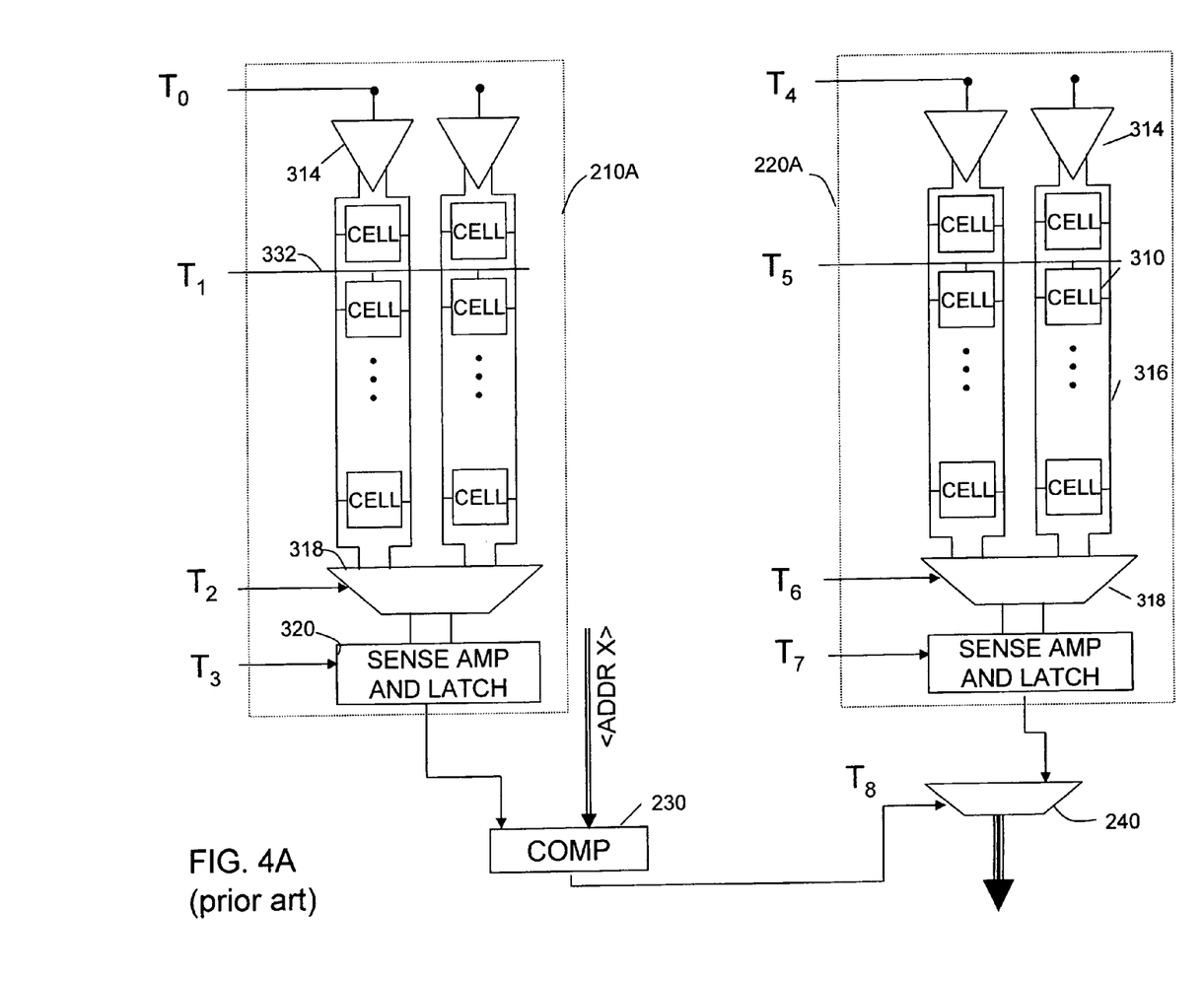
FIG. 4A is a more detailed diagram of a data flow path as in one implementation of the cache of FIG. 2.

FIG. 4A shows in simplified form portions of the cache 200 including details of memory construction as shown in FIG. 3. Signal $T_0$ turns off the driver 314 in one way of tag array 210A. Signal $T_1$ turns on the word line in the tag array. Signal $T_2$ enables multiplexer 318 and signal $T_3$ turns on sense amp 320 in the tag array. The output of the sense amp can be latched once the state of the column line is sensed. One mechanism for controlling the latching, which is used as an example herein, is to latch the output of the sense amp when $T_3$ is de-asserted. To minimize operating time, all ways in the tag array are read simultaneously.

A similar set of signals enables the components of way 220A in the data array. Signal $T_4$ turns off the driver 314 in way 220A of the data array. Signal $T_5$ turns on the word line in the data array. Signal $T_6$ enables multiplexer 318 and signal $T_7$ turns on sense amp 320 in the data array. Signal $T_8$ indicates that way select multiplexer 240 is enabled and the information read from the cache is therefore available. Such an architecture is useful when the values in the data array are read at the same time as the items in the tag array.

Figure 4B:
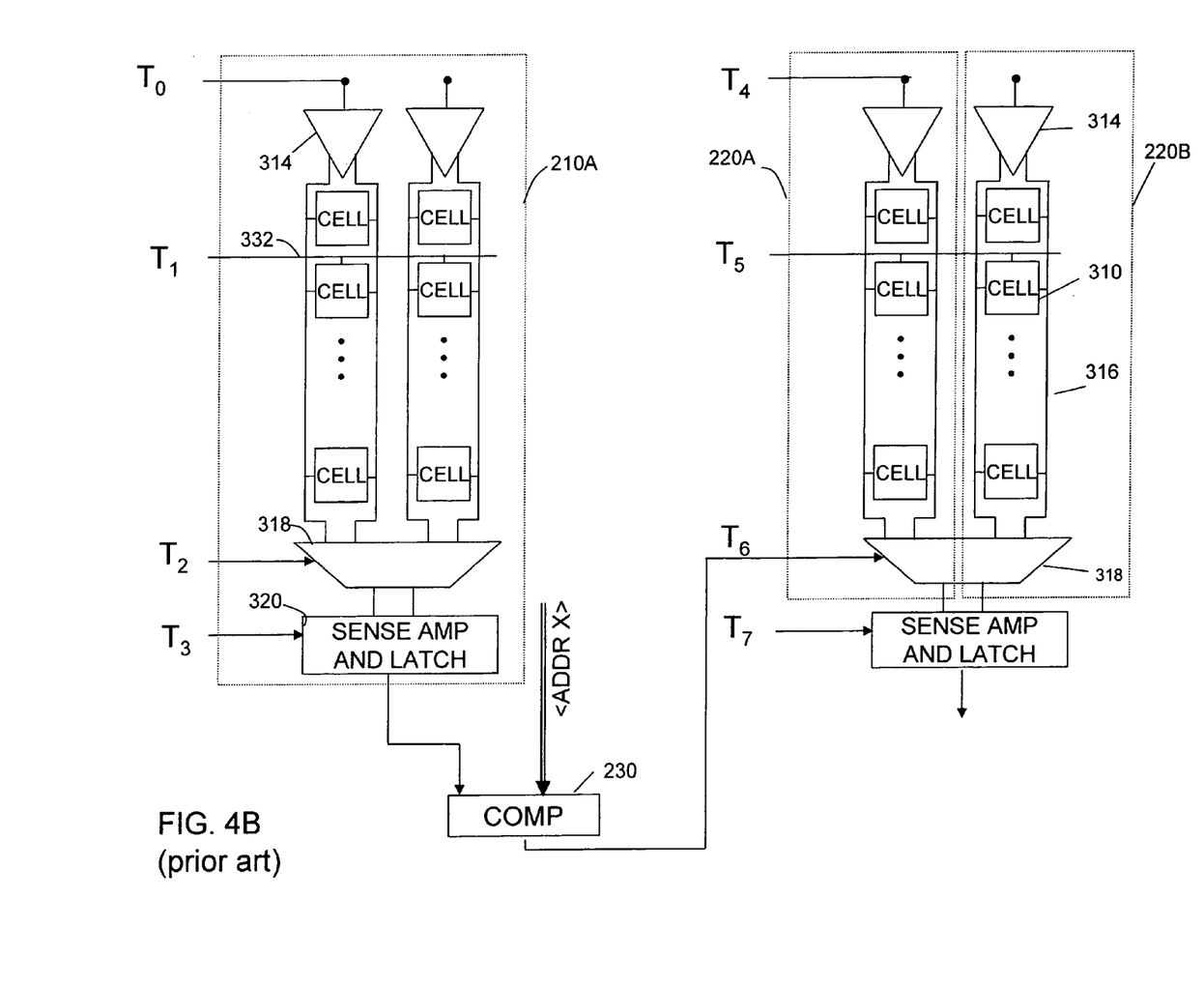
FIG. 4B is a more detailed diagram of a data flow path in a second implementation of the cache of FIG. 2.

FIG. 4B shows a structure that is useful if, for each access to the cache, the tag array and the data array are read sequentially. If the tag array is read first, the information read from the tag array can be used to select which way in the data array should be read.

FIG. 4B shows that the columns connected to the sense amp and latch in the data array form portions of separate ways 220A and 220B. The output of comparator 230 controls the selection of which column to read.

Figure 5:
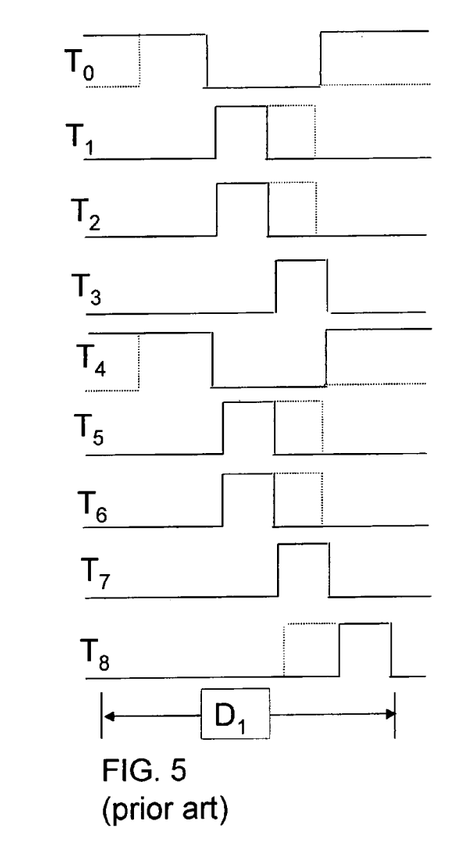
FIG. 5 is a timing diagram of a prior art method for accessing data in the cache shown in FIG. 4.

FIG. 5 shows an example of the sequencing of these signals. In FIG. 5, timing signals are applied to the tag array and the data array at the same time. Timing signals $T_3$ and $T_7$ are coincident, indicating data is available at the output of the tag array and the data array simultaneously. As a result, the full operation to read one value from the cache spans the interval $D_1$. Values can be read from the data array and the tag array at the same time because both are indexed by the Y address bits of the applied access. However, for simultaneous access to the tag array and the data array, every way in the data array must be read simultaneously for every memory access. Otherwise, the appropriate value would not be available when the signal $T_8$ enables way select multiplexer 240.

Figure 6:
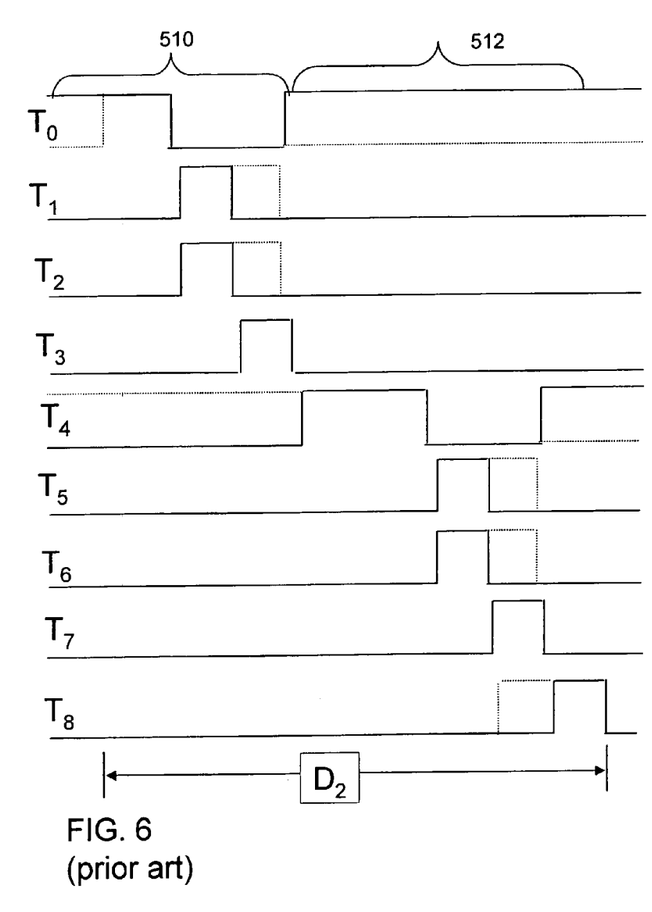
FIG. 6 is a timing diagram of an alternative prior art method for accessing data in the cache shown in FIG. 4.

FIG. 6 shows an example of alternative sequencing. FIG. 6 shows an interval 510 during which signals are applied to cause the tag array to produce an output. During a subsequent interval 512, signals are applied to cause the data array to produce an output sequential operation is apparent in the timing diagram by timing signal $T_4$ that begins the read operation from the data array occurring after timing signal $T_3$, which ends the read operation from the tag array. The full operation to read one value from the cache spans the interval $D_2$.

We have recognized that the timing sequences of FIG. 5 and FIG. 6 each have shortcomings. The sequential access shown in FIG. 6 is slower than the simultaneous access shown in FIG. 5. However, the simultaneous access of FIG. 5 consumes significantly more power than sequential access.

For sequential access as shown in FIG. 6, a value has already been read from the tag array before a read from the data array is begun with the assertion of signal $T_4$. Therefore, the way in the data array that needs to be read is known. Just that way can be read. Further, if the applied address results in a cache miss, the entire process of reading from the data array can be omitted. Thus, less power is consumed for cache access according to the method of FIG. 6, but each memory access takes longer.

In contrast, for the simultaneous access shown in FIG. 5, a read from the data array begins before it has been determined whether the applied address creates a cache "hit" or a "miss" and, if there is a hit, a read from the data array starts before it has been determined which way stores the correct information. Thus, power must be consumed reading all ways in the cache for every memory access. At most, one value is needed and in cases where there is a miss, none of the values read is be used.

Figure 7A:
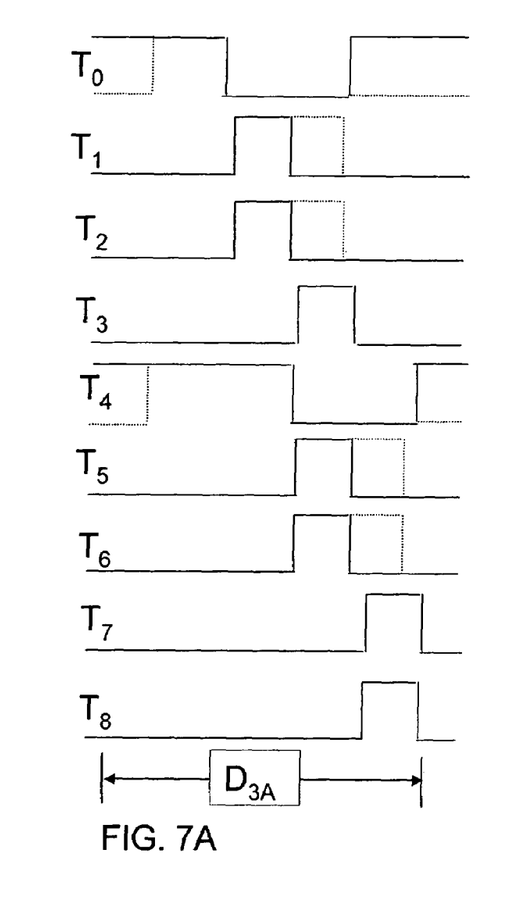
FIG. 7A is a timing diagram of a method for accessing information in the cache shown in FIG. 4A.
Figure 7B:
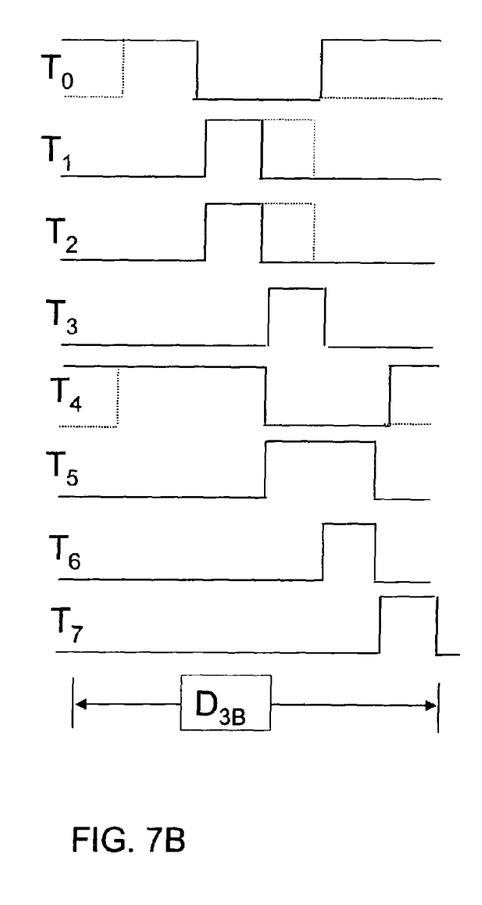
FIG. 7B is a timing diagram of a method for accessing information in the cache shown on FIG. 4B.

We have recognized that a different timing sequence results in a fast, yet low power, method of accessing the cache. FIGS. 7A and 7B shows an improved timing sequence. Much of the power used in a memory read operation is consumed by the sense amp. However, operation of the sense amp takes a small percentage of the read cycle—typically around 10%. On the other hand, pre-charging the column lines takes about 40% of the time required for a read operation. Further, timing on a cell in the column to alter the charge on the column lines take about 50% of the time required for a read operation. But, despite these relatively long times, these steps in the read operation consume little power. We have recognized a significant advantage can be obtained if the slow, low power portions of the read operation for the data array occur while the tag array is being read. But, the faster, high power steps are delayed until the data is read from the tag array, so that the total number of such operations performed can be reduced.

In both FIGS. 7A and 7B, the access to the tag array proceeds as in the prior two timing sequences. Accordingly, the timing of signals $T_0 \ldots T_3$ are as in the prior timing sequences. However, access to the data array is begun before a way match has been fully determined by reading a value from the tag array and getting an output form comparator 230.

Timing signal $T_4$, which starts the read operation from the data array, may be asserted before the way match has been fully determined. Because the way that will need to be read is not yet known, all the column lines corresponding to any way that could hold information corresponding to the applied Y address are taken out of precharge mode. The drivers 314 off all possible columns that need to be read are turned off in response to timing signal $T_4$. In the Illustrated embodiment, timing signal $T_4$ is essentially simultaneous with timing signal $T_3$, which enables the sense amp in the tag array.

In the illustrated embodiment, timing signal $T_5$ is also asserted essentially simultaneously with timing signal $T_3$. Asserting timing signal $T_5$ causes cells in the data array corresponding to any way that could hold information corresponding to the applied Y address to be connected to their associated column lines. During the time required for the data array cell to alter the charge on the column line sufficiently for the sense amp 320 of the data array to reliably determine the state of the column line, the output of the tag array sense amp 320 is produced. During this same time, the output of the tag array is compared to the X address bits in comparator 230 to determine the way match, if any, to be used to select the proper output of the data array.

After the output of the tag array is available and the comparison with the X address bits is complete, only the sense amp corresponding to the column line storing information for the matching way is enabled.

Both FIGS. 7A and 7B show that signal $T_4$ is asserted at the same time as signal $T_2$. The specific time when signal $T_4$ is asserted is not critical, though signal $T_4$ should be asserted sufficiently far in advance of $T_5$ that a column line is sufficiently precharged when signal $T_5$ is asserted.

FIGS. 7A and 7B differ in that FIG. 7B represents a circuit in which multiplexer 318 of the data array is used to perform the way selection in place of multiplexer 240. In each case, though, timing signal T7 occurs after timing signal T3 is asserted, meaning that the output of the tag array is available for use in selecting which way in the data array is read.

As can be seen in FIGS. 7A and 7B, the total time required to access a location in the cache is less than with sequential access as shown in FIG. 6. However, the power required to activate a word line is small in comparison to the power required to operate a sense amp and the circuitry connected down stream of the sense amp that could change state in response to the output of the sense amp changing. Consequently, the power required to operate a cache according to the sequence of either FIG. 7A or 7B is less than if the sequence of FIG. 5 were used.

Further, information is read from the tag array before sense amps in the data array are activated. As a result, timing signal $T_7$ might not be asserted at all if the information read from tag array indicates a "miss." Further power savings are achieved if no sense amp is turned on in the case of a cache miss.

Though less power is used in comparison to simultaneous access, the time required to read information from cache 200 is smaller than needed for sequential access. FIGS. 5-7 show relative timing and are not necessarily to scale. The time required to sufficiently alter the charge a column line to reliably and correctly sense the value in a memory cell, particularly for large memories, can be large in comparison to the time required to sense the state of the column line.

There are multiple alternatives for achieving the desired timing relationships. FIGS. 7A and 7B do not indicate whether the timing signals are derived directly from a clock (i.e. synchronous) or are generated in relation to events not tied to a common clock (i.e. asynchronous) or some combination of both. Any of these approaches may be used. If asynchronous timing signals are used, timing signal $T_7$ is preferably asserted as soon as possible after the output of the tag array is available to indicate which way in the data array should be read. Timing signal $T_7$ may be generated from a signal from the tag array indicating the read operation has been completed. Or, timing signal $T_7$ may be generated by delaying timing signal $T_3$ an amount to compensate for operation of sense amp 320 in the tag array 210 and comparator 230. Or, timing signal $T_7$ may be generated directly from the edge of a clock used in generation of $T_7$ and $T_3$.

If synchronous timing is used, the timing signals that control the read from the data array can be applied about halfway through the number of cycles needed to read from the tag array.

Having thus described several aspects of at least one embodiment of this invention, it is to be appreciated various alterations, modifications, and improvements will readily occur to those skilled in the art.

For example, the invention is illustrated in connection with a processor that performs digital signal processing functions. Benefits may also be achieved with general purpose digital computers or with processors that perform a combination of digital signal processing and general purpose processing functions. For example, the column driver is shown schematically as an amplifier. Here, "driver" refers to a switching circuit that, in response to a control input, provides a conducting path to a supply of charge or ground to create a differential charge on the column line. No specific structure of the driver circuitry in implied.

As a further example, the invention is not limited to cache memories implemented in SRAM. The techniques described above may be employed with any memory operating in a multi-step process. For example, it was described above that a column line in a memory is activated by charging the line and the value in a cell is read because the charge on the line is changed based on the content in the cell. Though not currently widely used, other methods of activating a memory may be used. For example, a memory may be constructed that indicates the presence of a bit of information by adding charge to a column line. In such a memory, the column line may be activated by removing charge from the line or otherwise placing the line in an identifiable state that is changed when information is read from a memory cell.

Further, the invention was described in connection with processor cores generating address information. The invention is useful in any electronic system in which any type of core or combination of cores accesses memory.

Also, each column line in the memory is shown to contain two separate conducting paths. Two such conducting paths are useful for representing signals in differential form. Though not presently preferred, it is possible to use single ended signals and therefore only a single conducting path for each column line.

Further, the cache is described as being implemented with "columns" of memory cells or cells that are connected to a "column line." "Bit line" is sometimes used as synonym for the column line. It should be appreciated that these terms imply cells that are constructed so that certain memory operations can be performed on them as a group. The groups of cells do not have to be physically positioned in a column. Nor does the group of cells have to correspond to the bits of a word.

Such alterations, modifications, and improvements are intended to be part of this disclosure, and are intended to be within the spirit and scope of the invention. Accordingly, the foregoing description and drawings are by way of example only.

What is claimed is:

1. A method of operating a cache in a computer system, the cache storing items associated with addresses in memory in the computer system, the cache having at least one way with a tag array and a data array, with information in the tag array indicating, for an address in memory applied to the cache, whether information in the data array is associated with the applied address, with the data array implemented as an array of cells connected to lines and a plurality of sense amps, with a sense amp being connectable to each of the lines, comprising, for each of the at least one way:
   a) making a determination, based on information stored in the tag array, whether an item associated with the applied address is stored in the way in the data array;
   b) selectively altering the state of at least one line in the way in the data array, that at least one line being associated with the applied address, the selective altering placing each of the at least one line in a state based on a value stored in at least one cell of the way of the data array at the applied address and the selective altering starting before completing the determination; and
   c) after completing the determination, when the information indicates an item is stored in the way in the data array, selectively enabling at least one sense amp associated with the at least one line in the way in the data array when it is determined that an item associated with the applied address is stored in the way.

2. The method of claim 1 wherein each sense amp is connectable to a plurality of lines and enabling the sense amp associated with a line in the indicated way comprises connecting the sense amp to a single one of the plurality of lines selectively in response to the information read from the tag array.

3. The method of claim 1 additionally comprising providing as a bit in the output of the cache, the output of the sense amp.

4. The method of claim 3 wherein the data array is implemented as memory having a plurality of banks, with each applied address associated with one or more lines in one of the banks and not associated with lines in at least a portion of the plurality of banks, the method further comprising, between the time that an address is applied to the tag array and an output is provided from the sense amp, performing a memory operation in a bank in the portion of the plurality of banks.

5. The method of claim 1 wherein the at least one way comprises 2 ways.

6. The method of claim 5 wherein the at least one way consists of 4 ways.

7. The method of claim 1 wherein making a determination comprises for each way in the cache: reading a tag field from a location in the tag array and comparing the value in the tag field to a portion of the bits in the applied address.

8. The method of claim 7 additionally comprising controlling the charge on each of the plurality of lines in the data array to place the lines in a predetermined state before starting to alter the state of the line.

9. The method of claim 1 wherein each of the lines comprises a column line in the memory and altering the state of at least one line comprises asserting a word line in the memory.

10. The method of claim 1 wherein, selectively enabling the sense amp comprises not enabling the sense amp during a cache read operation when it is determined that no item associated the applied address is stored in the way.

11. The method of claim 1 wherein, selectively altering the state of at least one line in the way in the data array occurs concurrently with making the determination.

12. A method of operating a cache in a computer system, the cache storing items associated with addresses in memory in the computer system, the cache having a tag array and a data array, the data array having a plurality of ways with information in the tag array indicating, for each address applied to the cache, in which, if any, way in the data array information associated with the applied address is stored, with the data array implemented as arrays of cells connected to lines and plurality of sense amps, with a sense amp being connectable to each of the lines,
   a) applying a first portion of the applied address to the tag array to address a location in each way of the tag array;
   b) comparing a second portion of the applied address to information read from the addressed locations in each way of the tag array to produce at a first time, an indication of a match between the first input and one of the ways;
   c) before the first time, altering the state of lines associated with the first portion of the applied address in each way of the data array, with the state of the lines based on information stored in the data array; and
   d) after the first time, sensing the state of a line associated with the first portion of the applied address in the data array, with the sensed line selected in response to the indication of a match.

13. The method of operating a cache in a computer system of claim 12 wherein each of the lines comprises a bit line in a semiconductor memory.

14. The method of operating a cache in a computer system of claim 13 wherein altering the state of lines comprises activating, for each of the lines, a cell connected to a word line in the semiconductor memory.

15. The method of operating a cache in a computer system of claim 12 additionally comprising placing the lines in a predetermined charge state.

16. The method of operating a cache in a computer system of claim 15 wherein altering the state of the lines comprises altering the charge on each line based on information stored in one memory cell.

17. The method of operating a cache in a computer system of claim 16 wherein each of the lines comprises a differential pair and altering the charge on the line comprises altering the charge difference between the lines.

18. The method of claim 12 wherein sensing the state of a line comprises enabling a sense amp selected based on the indication of a match.

19. The method of claim 12 wherein sensing the state of a line comprises activating a multiplexer based on the indication of a match to connect a selected line to a sense amp.

20. A method of performing a read operation with a cache in a computer system, the cache storing items associated with addresses in memory in the computer system, the cache having at least one way with a tag array and a data array, with information in the tag array indicating, for an address in memory applied to the cache, whether information in the data array is associated with the applied address, with the data array comprising a plurality of cells connected to a line and a sense amp connectable to the line, the method comprising:
   a) during a first interval:
      i) accessing a value the tag array based on the applied address;
      ii) selecting a cell in the data array based on the applied address;
      iii) altering the state of the line by connecting the selected cell to the line; and
      iv) making a determination, based on the accessed value, whether an item associated with the applied address is stored in the way in the data array; and
   b) during a second interval, the second interval, occurring after the first interval, in response to a determination that an item associated with the applied address is stored in the way in the data array, selectively enabling the sense amp.

21. The method of claim 20, further comprising, during the second interval, in response to a determination that an item associated with the applied address is not stored in the way in the data array, indicating a cache miss.

22. The method of claim 20, further comprising, during the first interval, precharging the line.

* * * * *